United States Patent
Lentzsch et al.

(10) Patent No.: US 12,492,207 B2
(45) Date of Patent: Dec. 9, 2025

(54) COMPOUNDS, PHARMACEUTICAL FORMULATIONS, AND METHODS FOR TREATMENT OF CANCER

(71) Applicant: The Trustees of Columbia University in the City of New York, New York, NY (US)

(72) Inventors: Suzanne Lentzsch, Bronx, NY (US); Shirong Li, Fort Lee, NJ (US); Jing Fu, Fort Lee, NJ (US); Donald W. Landry, New York, NY (US); Shixian Deng, White Plains, NY (US); Xiaoming Xu, Fair Lawn, NJ (US)

(73) Assignee: THE TRUSTEES OF COLUMBIA UNIVERSITY IN THE OF NEW YORK, New York, NY (US)

( * ) Notice: Subject to any disclaimer, the term of this patent is extended or adjusted under 35 U.S.C. 154(b) by 660 days.

(21) Appl. No.: 17/894,604

(22) Filed: Aug. 24, 2022

(65) Prior Publication Data
US 2023/0092728 A1    Mar. 23, 2023

Related U.S. Application Data

(63) Continuation of application No. PCT/US2021/019001, filed on Feb. 22, 2021.

(60) Provisional application No. 62/980,499, filed on Feb. 24, 2020.

(51) Int. Cl.
*C07D 487/04*    (2006.01)

(52) U.S. Cl.
CPC .................. *C07D 487/04* (2013.01)

(58) Field of Classification Search
CPC .................................... C07D 487/04
See application file for complete search history.

(56) References Cited

U.S. PATENT DOCUMENTS

| | | | |
|---|---|---|---|
| 6,911,443 B2 * | 6/2005 | Yura | A61P 17/06 |
| | | | 514/259.5 |
| 2014/0228349 A1 | 8/2014 | Boys et al. | |
| 2018/0282340 A1 | 10/2018 | Zhuo et al. | |

OTHER PUBLICATIONS

PubChem SID: 243954990, deposition date: Mar. 16, 2015, pp. 1-8.*
Li et al., The Inhibition of Gck Affect MAPK Cascade in Multiple Myeloma, Blood (2018) 132 (Supplement 1): 3202.*
Li et al., Germinal Center Kinase as a Therapeutic Target in Multiple Myeloma, Blood (2017) 130 (Supplement 1): 1795.*
International Search Report and Written Opinion dated Feb. 22, 2021 for corresponding PCT Application No. PCT/US21/19001.
PubChem-Sid: 243954990 Deposit Date: Mar. 16, 2015, pp. 1-8; p. 3, structure.

* cited by examiner

*Primary Examiner* — Svetlana M Ivanova
(74) *Attorney, Agent, or Firm* — McCormick, Paulding & Huber PLLC

(57) ABSTRACT

Compounds and methods for treatment of cancers such as multiple myeloma by inhibition of germinal center kinase.

7 Claims, No Drawings

COMPOUNDS, PHARMACEUTICAL FORMULATIONS, AND METHODS FOR TREATMENT OF CANCER

CROSS REFERENCE TO RELATED APPLICATIONS

This application is a continuation of International Application No. PCT/US2021/019001 filed on Feb. 22, 2021, which claims the benefit of U.S. provisional patent application 62/980,499 filed Feb. 24, 2020, each of which is hereby incorporated herein in its entirety for all purposes as if fully set forth herein.

FIELD OF THE INVENTION

The invention relates to compounds, pharmaceutical formulations, and methods for treatment of cancer, including multiple myeloma.

BACKGROUND OF THE INVENTION

The following discussion is provided merely to aid the reader in understanding the disclosure and is not admitted to describe or constitute prior art thereto.

Multiple myeloma (MM) is a hematologic cancer of plasma cells. The cause is unknown. The disease is considered treatable but is generally incurable. Treatments include steroids, chemotherapy, and stem cell transplants. Globally, MM affected 448,000 people and resulted in 101,100 deaths in 2015. In the United States, the disease affects 6.5 per 100,000 people per year. Without treatment survival is usually 4-5 years. The five-year survival rate is about 49%. An effective treatment for MM would be of great medical benefit.

Because of the undesirable side effects of chemotherapy and the complications attending stem cell transplantation, researchers have been investigating intervention in biochemical pathways for possible therapeutic targets. One of these therapeutic targets is the mitogen-activated protein kinase (MAPK) signaling pathway.

Germinal Center Kinase (GCK) is an essential regulator of stress-activated MAPK core signaling pathways. Recent studies revealing the role of GCK in tumorigenesis and cancer progression have generated increasing interest in GCK as a therapeutic target in cancer. GCK inhibition results in significant anti-MM effects by inducing cell cycle arrest and cell apoptosis accompanied by IKZF1/3 down regulation (Li et al, Blood 2017 130:1795). Compounds which inhibit the activity of GCK would be useful in the treatment of multiple myeloma.

In addition to multiple myeloma, MAPK core signaling pathways regulated by GCK play a role in the genesis and progression of all cancers, both hematologic and solid. Thus, compounds which inhibit the activity of GCK would be useful in treatment of MM and other cancers for which the MAPK signaling pathway plays a role in their genesis or growth.

SUMMARY OF THE INVENTION

Provided herein are compounds of formula (I), shown below:

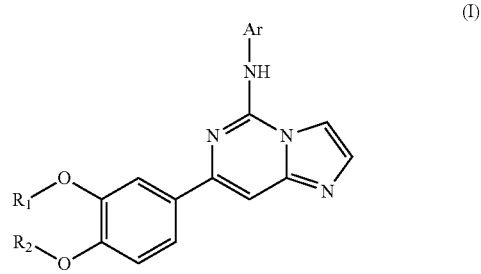

(I)

wherein $R_1$ is selected from hydrogen and loweralkyl; $R_2$ is selected from hydrogen and loweralkyl; $R_1$ and $R_2$ together are selected from —$CH_2$— and —$CH_2$—$CH_2$—; and Ar is a moiety of formula (II)

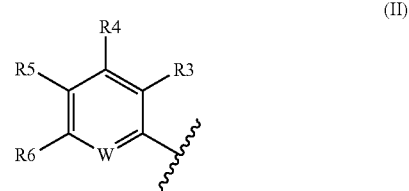

(II)

wherein $R_3$ is selected from hydroxy, loweralkoxy, —C(O)$NH_2$ and —NH—S(O)$_2$$CH_3$; $R_4$ is selected from loweralkoxy, halo, and hydrogen; R3 and R4 taken together may be —O—$CH_2$—$CH_2$—O—; $R_5$ is selected from halo and hydrogen; $R_6$ is selected from loweralkyl, loweralkoxy, and hydrogen; and W is CH or N.

In one embodiment of the compound of formula (I), Ar is selected from the following:

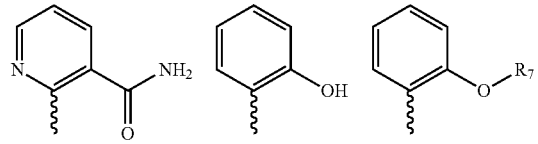

wherein $R_7$ is selected from hydroxy and methoxy.

In one embodiment, $R_1$ and $R_2$ are each methyl, $R_3$ is hydroxy, $R_4$, $R_5$, and $R_6$ are each hydrogen, and W is CH.

In one embodiment, the compound is selected from the compounds listed in Table I, set out below.

Also provided are methods of treating or ameliorating cancer in which MAPK core signaling pathways regulated by Germinal Center Kinase (GCK) play a part in tumorigenesis or cancer progression, including multiple myeloma, in a patient in need of such treatment comprising administration to said patient of an amount or dose of a compound of formula (I) therapeutically effective to treat or ameliorate the symptoms of the cancer.

In one embodiment, the method comprises administering a therapeutic amount or dose of the compound of formula (I) wherein Ar is selected from the following:

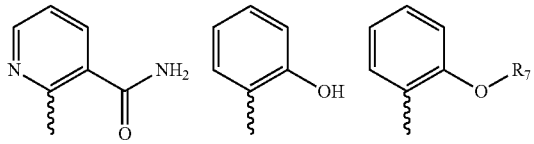

wherein $R_7$ is selected from hydroxy and methoxy.

In one embodiment the method comprises administering a therapeutic amount of a compound of formula (I) wherein $R_1$ and $R_2$ are each methyl, $R_3$ is hydroxy, $R_4$, $R_5$, and $R_6$ are each hydrogen, and W is CH.

In one embodiment the method comprises administering a therapeutic amount of a compound selected from the compounds listed in Table I.

In one embodiment of the method, the cancer to be treated is selected from multiple myeloma, melanoma. Diffuse large B cell lymphoma, and colon cancer.

Also provided are pharmaceutical formulations comprising a compound of formula (I) admixed with a pharmacologically acceptable carrier.

In one embodiment, the pharmaceutical formulation comprises a compound of formula (I) wherein Ar is selected from the following:

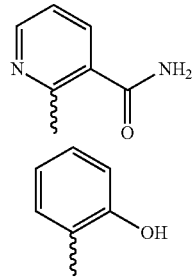

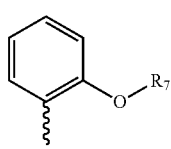

wherein $R_7$ is selected from hydroxy and methoxy.

In one embodiment the pharmaceutical formulation comprises a compound of formula (I) wherein $R_1$ and $R_2$ are each methyl, $R_3$ is hydroxy, $R_4$, $R_5$, and $R_6$ are each hydrogen, and W is CH.

In one embodiment the pharmaceutical formulation comprises a compound selected from the compounds listed in Table I The foregoing general description and following detailed description are exemplary and explanatory and are intended to provide further explanation of the invention.

DETAILED DESCRIPTION OF THE INVENTION

Provided herein are compounds of formula (I), shown below:

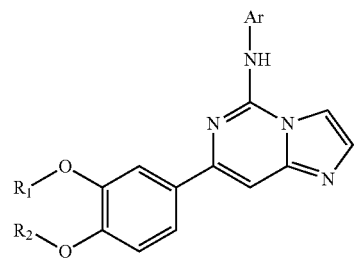

wherein $R_1$ is selected from hydrogen and loweralkyl; $R_2$ is selected from hydrogen and loweralkyl; $R_1$ and $R_2$ together are selected from —$CH_2$— and —$CH_2$—$CH_2$—; and Ar is a moiety of formula (II)

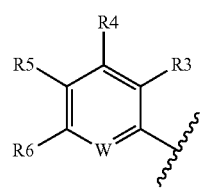

(II)

wherein $R_3$ is selected from hydroxy, loweralkoxy, —C(O)$NH_2$ and —NH—S(O)$_2CH_3$; $R_4$ is selected from loweralkoxy, halo, and hydrogen; R3 and R4 taken together may be —O—$CH_2$—$CH_2$—O—; $R_5$ is selected from halo and hydrogen; $R_6$ is selected from loweralkyl, loweralkoxy, and hydrogen; and W is CH or N.

In one embodiment of the compound of formula (I), Ar is selected from the following:

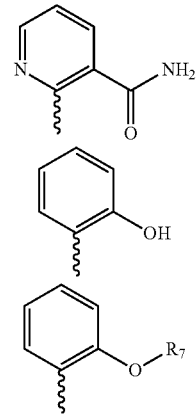

wherein $R_7$ is selected from hydroxy and methoxy.

In one embodiment, $R_1$ and $R_2$ are each methyl, $R_3$ is hydroxy, $R_4$, $R_5$, and $R_6$ are each hydrogen, and W is CH.

In one embodiment, the compound is selected from the compounds listed in Table I.

Also provided are methods of treating or ameliorating cancer in which MAPK core signaling pathways regulated by Germinal Center Kinase (GCK) play a part in tumorigenesis or cancer progression, including multiple myeloma, in a patient in need of such treatment comprising administration to said patient of an amount of a compound of formula (I) therapeutically effective to treat or ameliorate symptoms of the cancer.

In one embodiment, the method comprises administering a therapeutically effective amount or dose of the compound of formula (I) wherein Ar is selected from the following:

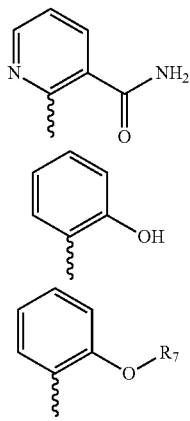

wherein $R_7$ is selected from hydroxy and methoxy.

In one embodiment the method comprises administering a therapeutically effective amount of a compound of formula (I) wherein $R_1$ and $R_2$ are each methyl, $R_3$ is hydroxy, $R_4$, $R_5$, and $R_6$ are each hydrogen, and W is CH.

In one embodiment the method comprises administering a therapeutically effective amount of a compound selected from the compounds listed in Table I In one embodiment, the cancer to be treated is selected from multiple myeloma, melanoma, diffuse large B cell lymphoma, and colon cancer.

Also provided are pharmaceutical formulations comprising a compound of formula (I) admixed with a pharmaceutically acceptable carrier.

In one embodiment, the pharmaceutical formulation comprises a compound of formula (I) wherein Ar is selected from the following:

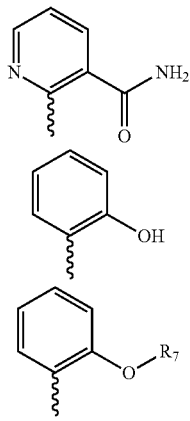

wherein $R_7$ is selected from hydroxy and methoxy.

In one embodiment the pharmaceutical formulation comprises a compound of formula (I) wherein $R_1$ and $R_2$ are each methyl, $R_3$ is hydroxy, $R_4$, $R_5$, and $R_6$ are each hydrogen, and W is CH.

In one embodiment the pharmaceutical formulation comprises a compound selected from the compounds listed in Table I.

Definitions

It is to be understood that the compounds, pharmaceutical formulations, and methods of the invention are not limited to the particular embodiments described, and as such may vary. It is also to be understood that the terminology used herein is for the purpose of describing particular embodiments only, and is not intended to be limiting. The scope of the present technology will be limited only by the appended claims.

As used herein, certain terms may have the following defined meanings. As used in the specification and claims, the singular form "a," "an" and "the" include singular and plural references unless the context clearly dictates otherwise. For example, the term "a cell" includes a single cell as well as a plurality of cells, including mixtures thereof.

As used herein, the term "comprising" is intended to mean that the compositions and methods include the recited elements, but do not exclude others. "Consisting essentially of" when used to define compositions and methods, shall mean excluding other elements of any essential significance to the composition or method. "Consisting of" shall mean excluding more than trace elements of other ingredients for the claimed compositions or trivial method steps for the claimed methods. Embodiments defined by each of these transition terms are within the scope of this disclosure. Accordingly, it is intended that the methods and compositions can include additional steps and components (comprising) or alternatively including steps and compositions of no significance (consisting essentially of) or alternatively, intending only the stated method steps or compositions (consisting of).

As used herein, "about" means plus or minus 10%.

As used herein, "optional" or "optionally" means that the subsequently described event or circumstance may or may not occur, and that the description includes instances where said event or circumstance occurs and instances where it does not.

As used herein, the terms "individual", "patient", or "subject" can be an individual organism, a vertebrate, a mammal (e.g., a bovine, a canine, a feline, or an equine), or a human. In a preferred embodiment, the individual, patient, or subject is a human.

As used herein, the phrases "therapeutically effective amount" and "therapeutic level" mean a compound dose or plasma concentration in a subject, respectively, that provides the specific pharmacological effect for which the compound is administered in a subject in need of such treatment, i.e., to reduce, ameliorate, or eliminate the effects or symptoms of multiple myeloma or other cancer. It is emphasized that a therapeutically effective amount or therapeutic level of a drug will not always be effective in treating the conditions/diseases described herein, even though such dosage is deemed to be a therapeutically effective amount by those of skill in the art. The therapeutically effective amount may vary based on the route of administration and dosage form, the age and weight of the subject, and/or the subject's condition, including the type and stage of the disease at the time that treatment commences, among other factors.

The terms "treatment" or "treating" as used herein with reference to a cancer such as multiple myeloma, refer to reducing, ameliorating or eliminating one or more symptoms or effects of the disease, including but not limited to anemia, bone pain, impaired kidney function, and neurologic symptoms, and/or increasing the patient's lifespan or 5-year survival.

As used herein, the term "loweralkyl" means aliphatic, saturated hydrocarbons of 1 to 6 carbon atoms, including methyl, ethyl, propyl, butyl, isopropyl, tert-butyl, and the like.

As used herein, the term "loweralkoxy" means aliphatic, saturated hydrocarbons of 1 to 6 carbon atoms bonded through an oxygen atom, including methoxy, ethoxy, propoxy, butoxy, isopropoxy, tert-butoxy, and the like.

As used herein the term "halo" means fluoro, chloro, iodo, or bromo.

Cancers treatable as described herein include multiple myeloma, melanoma, diffuse large B cell lymphoma, and colon cancer. See Ivanov, V. N., Kehrl, J. H. & Ronai, Z. Role of TRAF2/GCK in melanoma sensitivity to UV-induced apoptosis. Oncogene 19, 933-942 (2000); Matthews, J. M., et al. Pathophysiological significance and therapeutic targeting of germinal center kinase in diffuse large B-cell lymphoma. *Blood* 128, 239-248 (2016); and Lau, K. S., et al. BAY61-3606 Affects the Viability of Colon Cancer Cells in a Genotype-Directed Manner. *Plos One* 7(2012).

Although exemplary cancers treatable by the present method are described above, it should be understood that the present invention is not limited to treatment thereof. Any cancer for which the MAPK signaling pathway regulated by Germinal Center Kinase (GCK) plays a role in genesis or growth of the malignancy is treatable by the compounds, pharmaceutical formulations, and methods of the invention.

Pharmaceutical Formulations

Pharmaceutical compositions suitable for use in the methods described herein can include one or more of the disclosed compounds and a pharmaceutically acceptable carrier or diluent.

The composition may be formulated for intravenous, subcutaneous, intraperitoneal, intramuscular, oral, nasal, pulmonary, ocular, vaginal, or rectal administration. In some embodiments, the antibodies are formulated for intravenous, subcutaneous, intraperitoneal, or intramuscular administration, such as in a solution, suspension, emulsion, liposome formulation, etc. The pharmaceutical composition can be formulated to be an immediate-release composition, sustained-release composition, delayed-release composition, etc., using techniques known in the art.

Pharmacologically acceptable carriers for various dosage forms are known in the art. For example, excipients, lubricants, binders, and disintegrants for solid preparations are known; solvents, solubilizing agents, suspending agents, isotonicity agents, buffers, and soothing agents for liquid preparations are known. In some embodiments, the pharmaceutical compositions include one or more additional components, such as one or more preservatives, antioxidants, stabilizing agents and the like.

Additionally, the disclosed pharmaceutical compositions can be formulated as a solution, microemulsion, liposome, or other ordered structure suitable to high drug concentration. The carrier can be a solvent or dispersion medium containing, for example, water, ethanol, polyol (for example, glycerol, propylene glycol, and liquid polyethylene glycol, and the like), and suitable mixtures thereof. The proper fluidity can be maintained, for example, by the use of a coating such as lecithin, by the maintenance of the required particle size in the case of dispersion and by the use of surfactants. In some embodiment, it will be preferable to include isotonic agents, for example, sugars, polyalcohols such as mannitol, sorbitol, or sodium chloride in the composition. Prolonged absorption of the injectable compositions can be brought about by including in the composition an agent that delays absorption, for example, monostearate salts and gelatin.

Sterile injectable solutions can be prepared by incorporating the active compound in the required amount in an appropriate solvent with one or a combination of ingredients enumerated above, as required, followed by sterilization microfiltration. Generally, dispersions are prepared by incorporating the active compound into a sterile vehicle that contains a basic dispersion medium and the required other ingredients from those enumerated above. In the case of sterile powders for the preparation of sterile injectable solutions, the preferred methods of preparation are vacuum drying and freeze-drying (lyophilization) that yield a powder of the active ingredient plus any additional desired ingredient from a previously sterile-filtered solution thereof.

Pharmaceutical compositions of the disclosure can be administered in combination with other therapeutics that are part of the current standard of care for multiple myeloma or other cancer.

Methods of Treatment

In the method of the present invention, a therapeutically effective amount of at least one disclosed compound is administered to a patient (e.g., a human patient) suffering from a cancer for which the MAPK core pathways regulated by Germinal Center Kinase (GCK) play a role in tumorigenesis or cancer progression, such as multiple myeloma. to cause decrease or amelioration of one or more symptoms of the disease. In some embodiments, a therapeutically effective amount of the compound is administered together with a pharmaceutically acceptable carrier. Suitable pharmaceutically acceptable carriers are well-known in the art, as described above. A typical route of administration is parenterally (e.g., intravenously, subcutaneously, or intramuscularly), as is well understood by those skilled in the medical arts. Other routes of administration are, of course, possible. Administration may be by single or multiple doses. The amount of compound administered and the frequency of dosing may be optimized by the physician for the particular patient, as is well-understood in the cancer treatment art.

Exemplary doses can vary according to the size and health of the individual being treated, as well as the condition being treated. One of skill in the cancer treatment art can readily determine the appropriate dose and dosing regimen.

The disclosed methods of treatment many also be combined with other known methods of treatment as the situation may require. One current standard of care for multiple myeloma in patients under the age of 65 generally involves high-dose chemotherapy, but autologous blood stem cell transplantation (ASCT) is becoming the preferred treatment. For patients over the age of 65 and those who cannot tolerate stem-cell transplantation, the standard of care has been chemotherapy with melphalan and prednisone, often together with bortexomib. The present method used for treatment of multiple myeloma could be employed together with any of the above, either before, concurrently with, or thereafter.

The following examples are given to illustrate the present invention. It should be understood, however, that the invention is not to be limited to the specific conditions or details described in these examples. All printed publications referenced herein are specifically incorporated by reference.

Synthesis

The subject compounds are prepared according to the following general synthetic scheme:

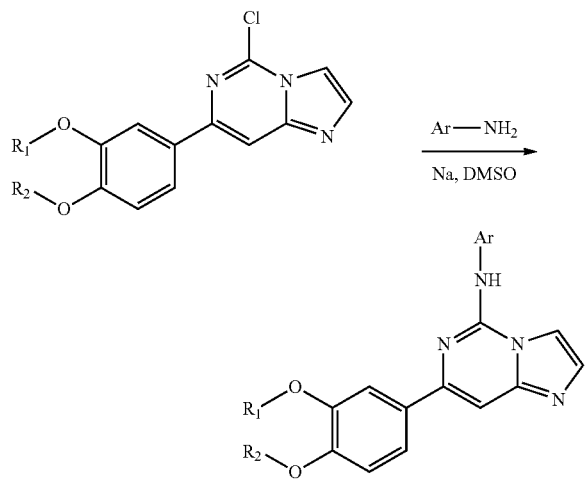

A representative synthetic example is given below.

Synthesis of Compound A20

To the solution of X1 (100 mg, 0.377 mmol) in DCM (3 mL) was added BBr$_3$ (1M, 1.13 mL, 1.13 mmol) at 0° C. The resulting mixture was stirred at that temperature for 1 h and was quenched with ice. The organic solvent was evaporated and the solid was collected by filtration. Yield: 79.3 mg. Mass seen: +262 [M+H]$^+$.

Compound X2 (50 mg) was dissolved in DMF (1.2 mL). To that solution was added Cs$_2$CO$_3$ (187 mg) and BrCH$_2$CH$_2$Br (0.5 mL). The reaction mixture was stirred at 50° C. for 2 h. The solvent was evaporated and the crude mixture was purified by PTLC to yield X3 (3.2 mg). Mass seen: +288 [M+H]$^+$.

To The solution of X3 (3.2 mg) and methyl 2-aminonicotinate in DMSO (0.5 mL) was added sodium hydride (2 mg). The resulting mixture was stirred at r.t. for 1 h and was quenched with water. The water layer was extracted with ethyl acetate. The organic layer was dried and concentrated to provide a crude mixture. Mass seen: +404 [M+H]$^+$. The crude X4 was dissolved in ammonia in methanol (7N, 2 mL) and the reaction was stirred at 70° C. overnight. Solvent was evaporated and crude product was purified with PTLC to provide A20 (0.7 mg). Mass seen: +389 [M+H]⁺. ¹HNMR in CDCl₃: δ 10.39 (1H), 8.79 (1H), 8.39 (1H), 7.72 (1H), 7.58 (1H), 7.26 (1H), 7.08 (1H), 6.11 (1H), 4.36 (4H).

Following either the general synthetic scheme or the method of synthesis for compound A20 but using the appropriate starting materials and other reagents, the compounds shown in Table I were prepared.

TABLE 1

| Compound Designation | Structure |
|---|---|
| A4 | |
| A10 | |
| A13 | |
| A14 | |
| A20 | |
| A22 | |
| A35 | |

TABLE 1-continued

| Compound Designation | Structure |
|---|---|
| A36 | 4-chloro-2-methoxyphenyl-NH-imidazo[1,2-c]pyrimidine with 3,4-dimethoxyphenyl |
| A37 | 2,3-dihydro-1,4-benzodioxin-5-yl-NH-imidazo[1,2-c]pyrimidine with 3,4-dimethoxyphenyl |
| A38 | 2,3-dimethoxyphenyl-NH-imidazo[1,2-c]pyrimidine with 3,4-dimethoxyphenyl |
| A39 | 2,5-dimethoxyphenyl-NH-imidazo[1,2-c]pyrimidine with 3,4-dimethoxyphenyl |
| A45 | 3-fluoro-2-hydroxyphenyl-NH-imidazo[1,2-c]pyrimidine with 3,4-dimethoxyphenyl |
| A47 | 2-hydroxyphenyl-NH-imidazo[1,2-c]pyrimidine with 3,4-dihydroxyphenyl |
| A48a | 2-(methylsulfonamido)phenyl-NH-imidazo[1,2-c]pyrimidine with 3,4-dimethoxyphenyl |

TABLE 1-continued

| Compound Designation | Structure |
|---|---|
| A48b | 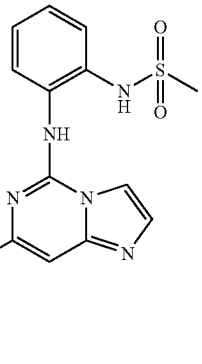 Same MW |

Testing

The over-expression of GCK in primary MM compared to normal cells was confirmed by immunohistochemistry staining of primary MM patient bone marrow biopsies. By quantitatively comparing the staining scores of GCK of primary MM patient bone marrows (n=26) and normal donor bone marrows (n=26), we found a significantly higher GCK expression (p<0.001) in MM patient BM samples (98%) compared to healthy donor BM samples (47%). GCK protein expression level was induced by several cytokines that are critically involved in MM cell survival and proliferation including IL-6, TNF-α, LPS and CD40L in MM cells after treatment for 1 h. The role of GCK expression in MM signaling transduction and tumor progression was addressed by inducible GCK-knockdown in MM cells. By generating Tet-on-shGCK-MM cell lines, we found that doxycycline-induced GCK silencing blocks IL-6 induced phosphorylation of MKK4, MKK7, JNK and ERK in MM.1S cells. Moreover, knockdown of GCK causes downregulation of IKZF1/3, c-MYC and BCL-6 in MM cells.

To exclude the off-target effects of the GCK-shRNA and confirm the specific and critical role of GCK, we further generated recombinant GCK-WT and GCK-shRNA resistant allele construct with C-terminal c-Myc tag, and introduced them into the GCK inducible KD cells to determine if shRNA-resistant GCK can rescue the growth inhibition induced by the shRNA. Tet-on-shGCK-RPMI-8266 cells transduced with empty vector (EV) or GCK wild-type with c-Myc tag (WT) or GCK shRNA resistant mutation with c-myc tag (MT) were generated by routine lentiviral infection. Doxycycline-induced tet-on-shGCK expression resulted in significant decrease of GCK protein. Both endogenous GCK and wild-type GCK-c-Myc expressions were silenced. In contrast, expression of GCK shRNA resistant allele with c-Myc tag (MT) was not affected. The rescue effects of this allele on MM cells growth inhibition are undergoing.

To test the efficacy of the subject compounds against MM, varying doses of each compound were administered to MM patient bone marrow samples and the MAPK cascade activity measured. The subject compounds caused pharmacologic blockade of GCK that dose-dependently downregulated ERK, p38 and JNK phosphorylation in MM cells.

The compounds shown in Table I gave positive results in the above tests.

In MM, IMiDs treatment leads to the selective ubiquitination and degradation of IKZF1 and IKZF3 by the CRBN-CRL4 ubiquitin ligase. Suppression of CRBN in MM cell lines induces IMiDs resistance. Surprisingly, the subject compounds retained the ability to decrease IKZF1 protein level and inhibit MM cell growth in MM cells with CRBN-knockdown, indicating that GCK-induced IKZF1 down-regulation is independent of CRBN.

As shown above, GCK is overexpressed in MM and an attractive target for multiple myeloma therapy, as well as for other cancers in which there is regulation of tumorigenesis or cancer progression by GCK. The inhibition of GCK blocks the phosphorylation and activation of MAPK cascade, and induces the degradation of the substrate proteins IKZF1, IKZF3 and c-Myc. The subject compounds represent a novel anti-MM therapy, especially in relapsed and IMiDs-resistant MM patients, as well as a novel therapy for any cancer for which there is regulation of tumorigenesis or cancer progression by GCK.

One of skill in the cancer treatment art would recognize that the compounds, pharmaceutical formulations, and methods described herein would be useful to treat any cancer in which MAPK core signaling pathways regulated by Germinal Center Kinase (GCK) play a part in tumorigenesis or cancer progression.

All publications referred to herein are incorporated into this application by reference in their entirety for all purposes as if fully set forth herein.

Although the compositions, methods, and pharmaceutical formulations of the invention have been described in the present disclosure by way of illustrative examples, it is to be understood that the invention is not limited thereto and that variations can be made as known by those skilled in the art without departing from the teachings of the invention defined by the appended claims.

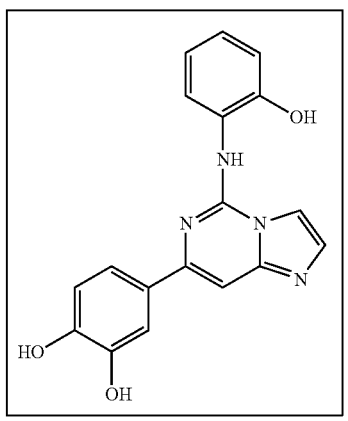
and
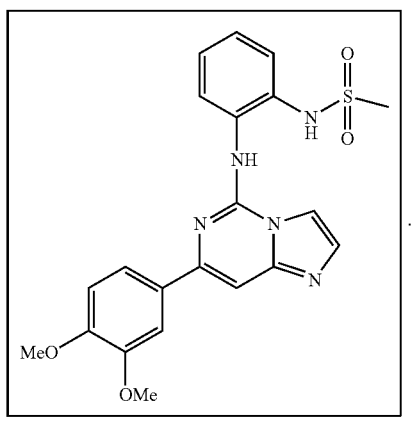
6. The method of claim 2 wherein the cancer is selected from multiple myeloma, melanoma, diffuse large B cell lymphoma, and colon cancer.
7. A pharmaceutical formulation selected from the group consisting of
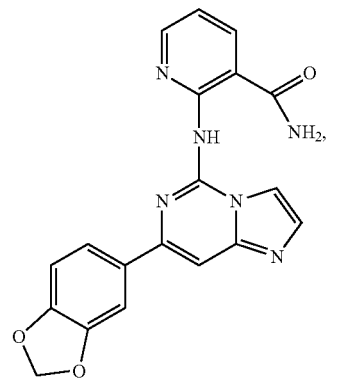
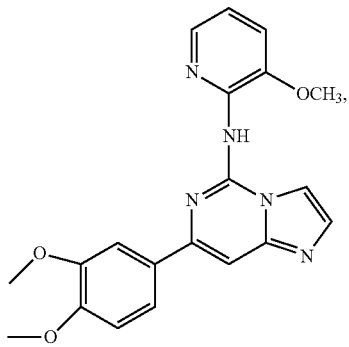
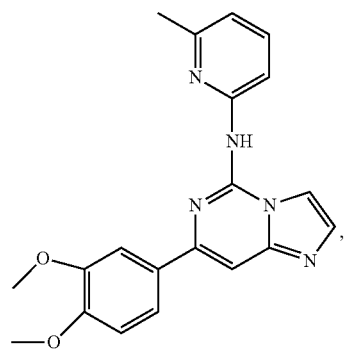
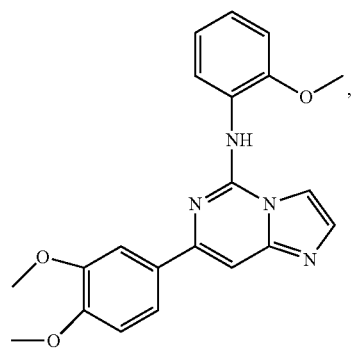
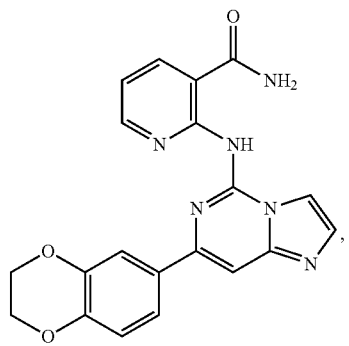

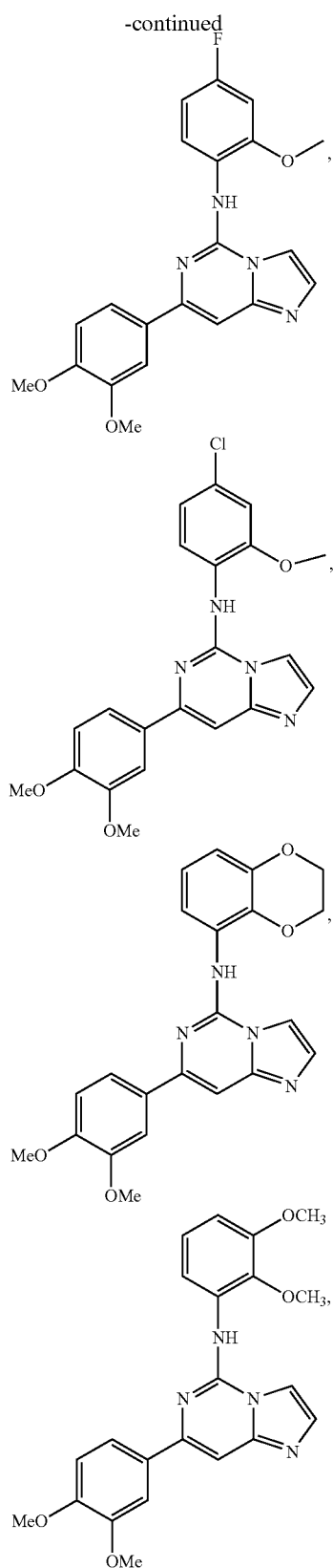
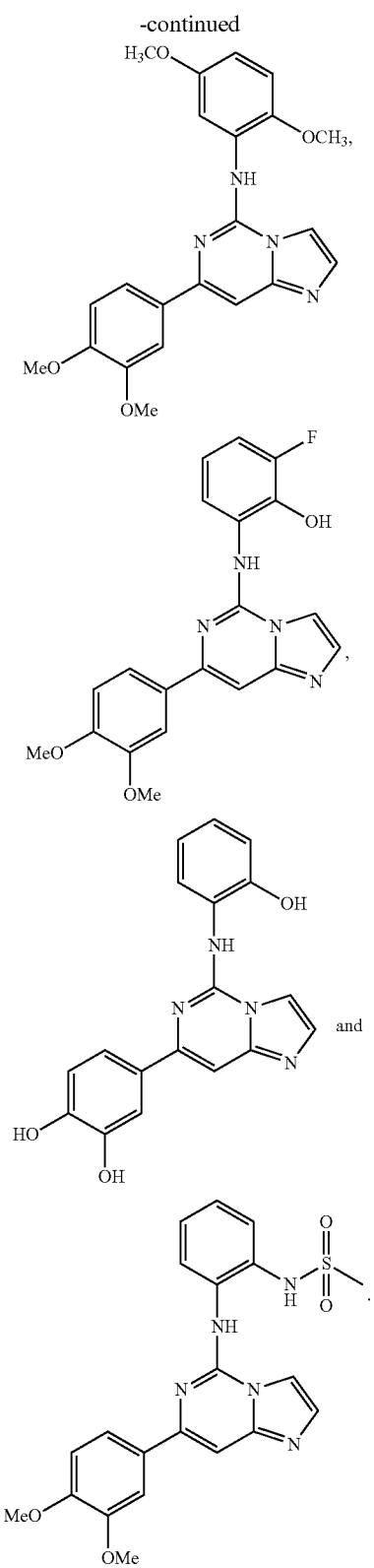

What is claimed is:

1. A compound selected from the group consisting of

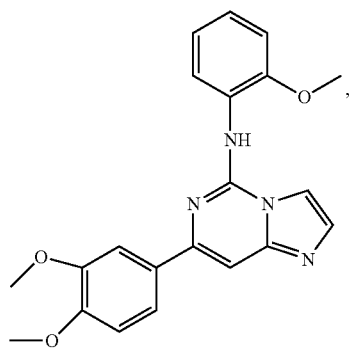

-continued
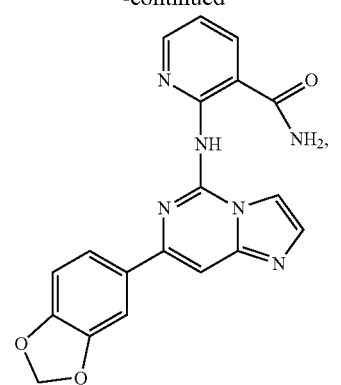
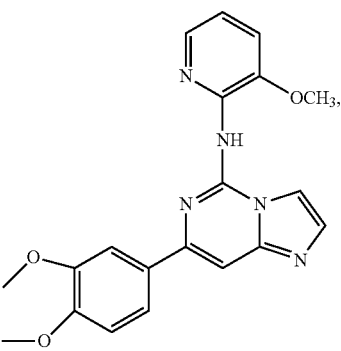
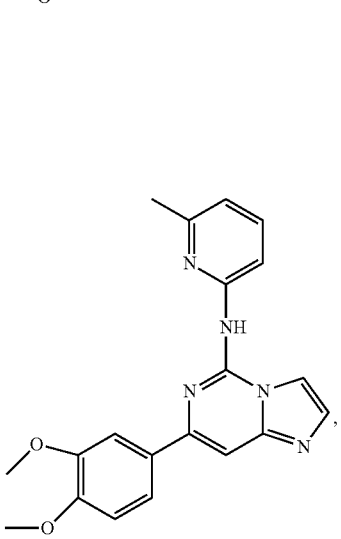
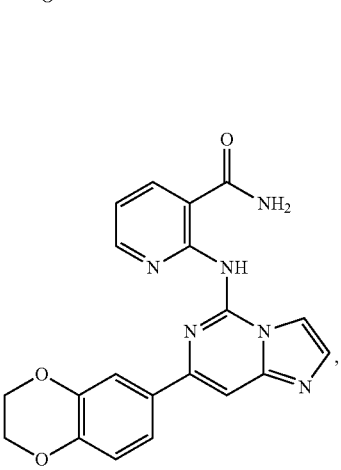
-continued
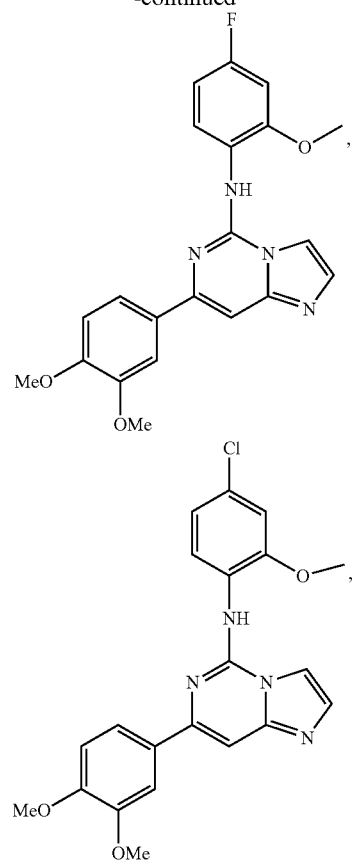
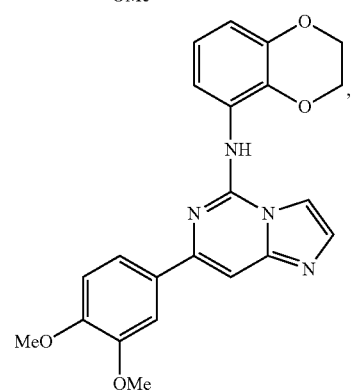
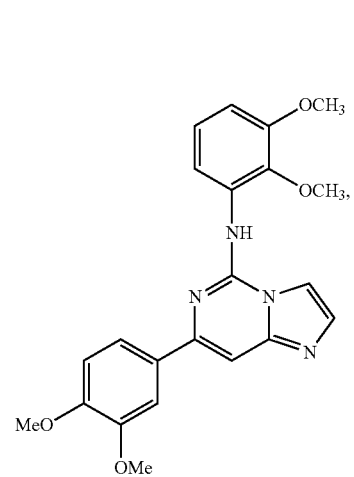

-continued

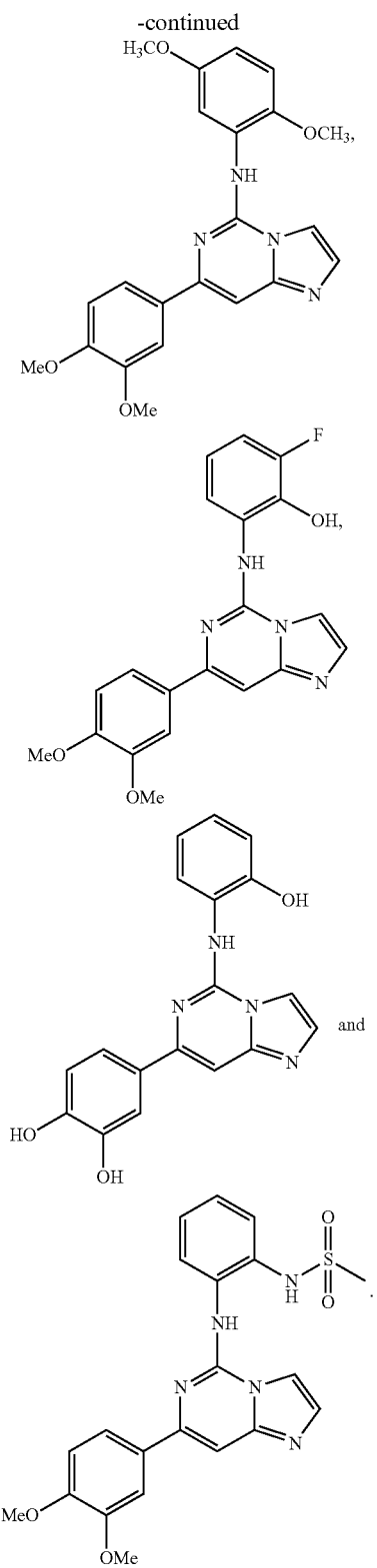

and

2. A method of treating or ameliorating a cancer for which MAPK core signaling pathways regulated by Germinal Center Kinase (GCK) play a part in tumorigenesis or cancer progression in a patient in need of such treatment comprising administration to said patient of an amount of a compound having the formula:

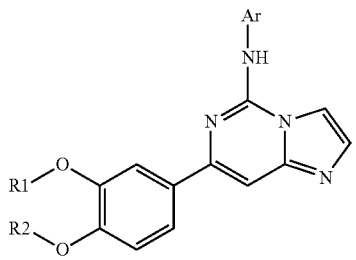

wherein $R_1$ is selected from hydrogen and loweralkyl; $R_2$ is selected from hydrogen and loweralkyl; $R_1$ and $R_2$ together are selected from —CH$_2$— and —CH$_2$—CH$_2$—; and Ar is a moiety of formula (II)

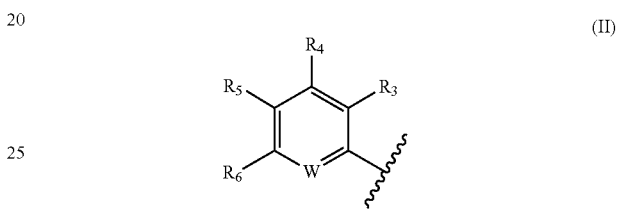

wherein $R_3$ is selected from hydroxy, loweralkoxy, —C(O)NH$_2$ and —NH—S(O)$_2$CH$_3$; $R_4$ is selected from loweralkoxy, halo, and hydrogen; R3 and R4 taken together may be —O—CH$_2$—CH$_2$—O—; $R_5$ is selected from halo and hydrogen; $R_6$ is selected from loweralkyl, loweralkoxy, and hydrogen; and W is CH, said amount being therapeutically effective to treat or ameliorate the cancer.

3. The method of claim 2 wherein Ar is

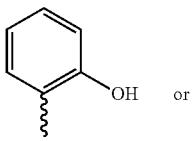 or

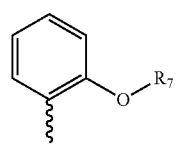

and wherein $R_7$ is methyl.

4. The method of claim 1 wherein R1 and R2 are each methyl, $R_3$ is hydroxy, and $R_4$, $R_5$, and $R_6$ are each hydrogen.

5. The method of claim 2 wherein the compound is selected from the group consisting of
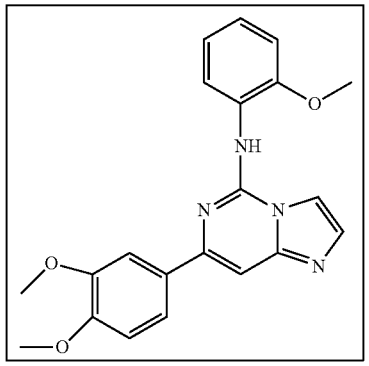
,
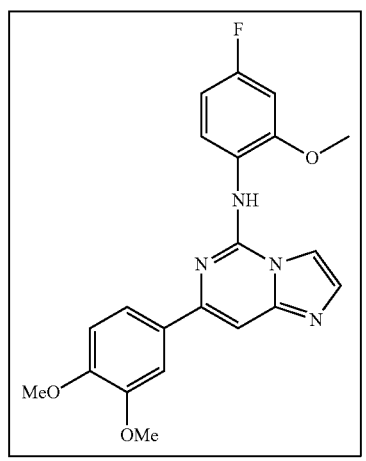
,
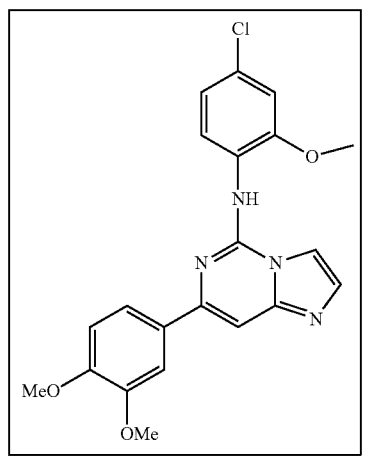
,
-continued
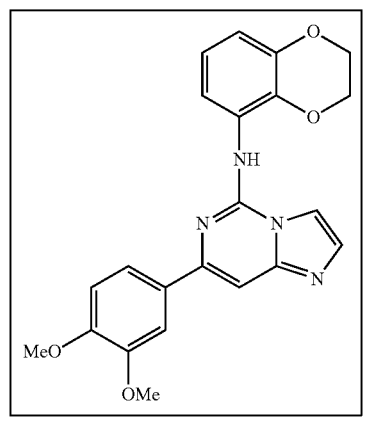
,
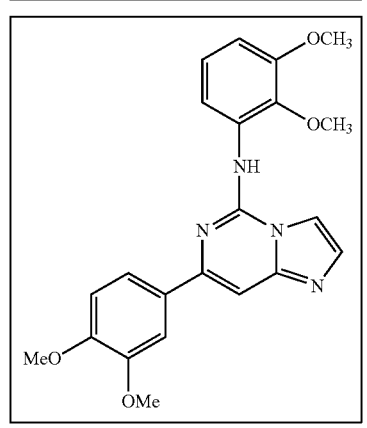
,
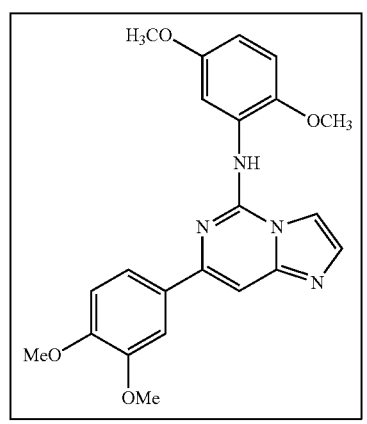
,
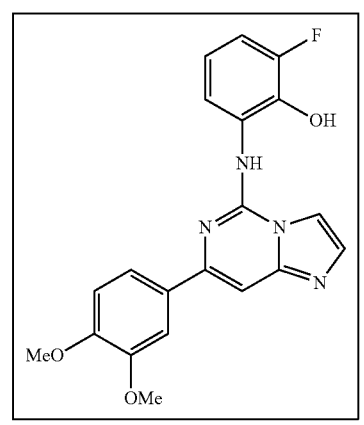
,